United States Patent
Li (10) Patent No.: US 8,484,469 B2
(45) Date of Patent: Jul. 9, 2013

(54) METHOD, SYSTEM AND EQUIPMENT FOR KEY DISTRIBUTION

(75) Inventor: Chunqiang Li, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 285 days.

(21) Appl. No.: 12/728,946

(22) Filed: Mar. 22, 2010

(65) Prior Publication Data

US 2010/0174906 A1 Jul. 8, 2010

Related U.S. Application Data

(63) Continuation of application No. PCT/CN2008/073062, filed on Nov. 14, 2008.

(30) Foreign Application Priority Data

Nov. 16, 2007 (CN) .......................... 2007 1 0188317

(51) Int. Cl.
*H04L 29/06* (2006.01)

(52) U.S. Cl.
USPC .............. 713/168; 380/44; 380/278; 380/280

(58) Field of Classification Search
None
See application file for complete search history.

(56) References Cited

U.S. PATENT DOCUMENTS

| | | | |
|---|---|---|---|
| 6,766,453 B1 | 7/2004 | Nessett et al. | |
| 8,363,258 B2 | 1/2013 | Suzuki et al. | |
| 2003/0070068 A1 | 4/2003 | Medvinsky | |
| 2003/0149871 A1 | 8/2003 | Medvinsky | |
| 2004/0103282 A1 | 5/2004 | Meier et al. | |
| 2006/0053289 A1 | 3/2006 | Singh | |
| 2007/0172041 A1 | 7/2007 | Boccon-Gibod et al. | |
| 2007/0192836 A1* | 8/2007 | Shiran et al. ................ | 726/4 |
| 2007/0198836 A1 | 8/2007 | Fedyk et al. | |
| 2007/0280482 A1* | 12/2007 | Yan et al. .................... | 380/278 |
| 2009/0092060 A1 | 4/2009 | Goto | |
| 2009/0238368 A1* | 9/2009 | Nonaka et al. ............. | 380/280 |

FOREIGN PATENT DOCUMENTS

| | | |
|---|---|---|
| CN | 1564509 A | 1/2005 |
| CN | 1564514 A | 1/2005 |
| CN | 1564514 A | 12/2005 |
| CN | 1770681 A | 5/2006 |

(Continued)

OTHER PUBLICATIONS

European Patent Office, Office Action in European Patent Application No. 08849967.8 (Jan. 16, 2012).

(Continued)

*Primary Examiner* — Brandon Hoffman
*Assistant Examiner* — Michael D Anderson
(74) *Attorney, Agent, or Firm* — Leydig, Voit & Mayer, Ltd.

(57) ABSTRACT

A method, system and equipment for key distribution are disclosed. During the course of computing a shared key Kab between a client node and a third party equipment, a serial number is introduced into keying materials to compute the Kab, instead of just using constant parameter, thus once the Kab is leaked, the Kab can be simply and duly updated by updating the variable parameter, and hence the security of message transmission is improved. Furthermore, in the implementations, methods for security protection and security verification for message are used, so as to effectively prevent threats to message security such as message forgery or replay attack, and hence further improve the security of message transmission.

15 Claims, 5 Drawing Sheets

FOREIGN PATENT DOCUMENTS

| | | | |
|---|---|---|---|
| CN | 1819515 | A | 8/2006 |
| CN | 1770681 | A | 10/2006 |
| CN | 1964259 | A | 5/2007 |
| GB | 2 391 139 | A | 1/2004 |
| JP | 2004-208073 | | 7/2004 |
| JP | 2005505991 | A | 2/2005 |
| JP | 2005517347 | A | 6/2005 |
| JP | 2006-505216 | A | 2/2006 |
| JP | 2006352281 | A | 12/2006 |
| JP | 2007047846 | A | 2/2007 |
| JP | 2007104236 | A | 4/2007 |
| JP | 2009-500913 | A | 1/2009 |
| JP | 2009512096 | A | 3/2009 |
| WO | WO 03/107584 | A1 | 12/2003 |
| WO | WO 2006/093161 | A1 | 9/2006 |
| WO | WO 2007/005310 | A1 | 1/2007 |
| WO | WO 2007047846 | A3 | 4/2007 |
| WO | WO 2007/121587 | A1 | 11/2007 |

OTHER PUBLICATIONS

Extended European Search Report in corresponding European Application No. 08849967.8 (Aug. 3, 2011).

Aboba et al., "Extensible Authentication Protocol (EAP)," Network Working Group, Jun. 2004, The Internet Society, Reston, Virginia.

Written Opinion in PCT Application No. PCT/CN2008/073062, mailed Feb. 12, 2009.

Office Action in Chinese Application No. 200880007872.3, mailed Jun. 11, 2010, see Ref. Al.

Nakhjiri, M., et al., "Derivation, delivery and management of EAP based keys for handover and re-authentication," Network Working Group—Internet-Draft, Document ID: draft-ietf-hokey-key-mgm-00, Jun. 22, 2007.

Harkins, D., et al., "Problem Statement and Requirementts on a 3-Party Key Distribution Protocol for Handover Keying," Network Working Group—Internet-Draft, Document ID: draft-ohba-hokey-3party-keydist-ps-01, Mar. 4, 2007.

Nakhjiri, M., et al., "Derivation, delivery and management of EAP based keys for handover and re-authentication," Network Working Group—Internet-Draft, Document ID: draft-ietf-hokey-key-mgm-01, Nov. 7, 2007.

$2^{nd}$ Office Action in corresponding Chinese Application No. 200880007872.3 (Mar. 3, 2011).

Otway et al., "Efficient and Timely Mutual Authentication," Jan. 1987, Association for Computing Machinery, New York, New York.

Tanaka et al., "Verification of Security Protocols Using SPIN," Jan. 8, 2013, Shizouka University, Shizuoka, Japan.

$2^{nd}$ Office Action in corresponding Japanese Patent Application No. 2010-530263 (Jan. 8, 2013).

Japanese Patent Office, Notice of Reasons for Rejection in Japanese Application No. 2010-530263 (Jul. 24, 2012).

Harkins et al., "Problem Statement and Requirements on a 3-Party Key Distribution Protocol for Handover Keying," Network Working Group, Internet-Draft, http://wiki.tools.ietf.org/html/draft-ohba-hokey-3party-keydist-ps-01 (Mar. 4, 2007).

Marin et al., "Protocolo seguro para autenticación rápida en redes inalámbricas basadas en EAP," IEEE Latin America Transactions, vol. 5, No. 6, pp. 486-493 (Oct. 2007).

Nakhjiri et al., "Keying and Signaling for Wireless Access and Handover Using EAP (EAP-HR)," Network Working Group, Internet-Draft, http://tools.ietf.org/html/draft-nakhjiri-hokey-hierarchy-04 (Apr. 5, 2007).

$2^{nd}$ Office Action in corresponding European Patent Application No. 08849967.8 (Apr. 3, 2013).

Menezes et al., "Handbook of Applied Cryptography," 1997, Chapter 12, pp. 489-541, CRC Press, Boca Raton, Florida.

\* cited by examiner

METHOD, SYSTEM AND EQUIPMENT FOR KEY DISTRIBUTION

CROSS-REFERENCE TO RELATED APPLICATIONS

This application is a continuation of International Application No. PCT/CN2008/073062, filed on Nov. 14, 2008, which claims priority to Chinese Patent Application No. 0200710188317.2, filed on Nov. 16, 2007, both of which are hereby incorporated by reference in their entireties.

FIELD OF TECHNOLOGY

The present invention relates to network security technology, and particularly to a method, system and equipment for key distribution.

BACKGROUND OF THE INVENTION

With the continuous development of network security technologies, the requirement for network security technology also becomes higher and higher. Cryptology is a core technology of network and information security, and in the modern cryptology, security is based on key protection instead of algorithm secrecy, thus key protection management is most important for information security. The key management includes key generation, storage, distribution, etc., and the key distribution is a critical issue of the key management. In a system based on symmetric cryptography, in order to solve the problem of key distribution, a key distribution server is usually available, and each of the two parties to be communicated in the system has a shared key with the key distribution server, and a shared key for protecting communication between both parties is established through message exchanging.

Figure 1:
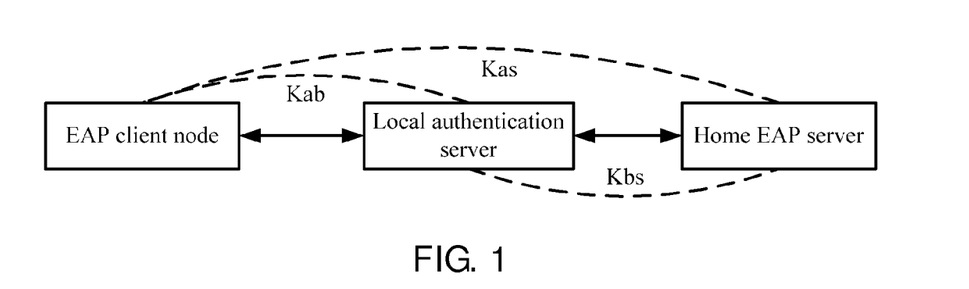
FIG. 1 is a structural diagram of a conventional network.

During actual applications, the following situation usually occurs: one or more shared keys Kas are available between a client node and a verification server, and one or more shared keys Kbs are available between a third party equipment and the verification server. However, when a message interaction needs to be carried out between the client node and the third party equipment, a shared key Kab shall exist between the client node and the third party equipment, so as to give a security protection to the message interaction between the client node and the third party equipment. Thus, the verification server shall generate the shared key Kab between the client node and the third party equipment, and distribute the Kab to the client node and the third party equipment, so that the client node and the third party equipment can acquire the Kab. For example, in the network architecture as shown in FIG. 1, a Home EAP server, which is used as the verification server, shall generate a shared key between an EAP client node and a local authentication server.

In the prior art, the process of key distribution is mainly as follows: a client node sends to a third party equipment a key distribution request including a client node identification IDa and a third party equipment identification IDb; after receiving the key distribution request, the third party equipment sends to a verification server the key distribution request including the client node identification IDa and the third party equipment identification IDb; after receiving the key distribution request sent by the third party equipment, the verification server generates a shared key Kab by using keying materials, such as a shared key Kas between the client node and the verification server, a character string Label related to the purpose of the Kab, the client node identification IDa, the third party equipment identification IDb, key length, etc., and sends to the third party equipment a portion formed by encrypting the generated Kab, IDa, IDb, and Kab lifetime with the Kbs, and a portion that generates MIC from the generated Kab, IDa, IDb and Kab lifetime by using the Kas; the third party equipment decrypts the encrypted portion with the Kbs, so as to acquire the Kab, and forwards to the client node a portion to which an integrity protection is given by using the Kas; the client node carries out an integrity verification for partial information forwarded from the third party equipment by using the Kas, and acquires the Kab when the verification succeeds.

During the process of implementing the present invention, the inventor finds that the prior art has at least the following problem:

As the keying materials used by the verification server to generate the shared key Kab are all constant parameters, the Kab cannot be changed in the lifetime of the Kab, even if the Kab is leaked, and hence the security of key distribution is decreased.

SUMMARY OF THE INVENTION

The embodiments of the present invention provide a method, system and equipment for key distribution, so as to improve the security of key distribution.

A method for key distribution, including the following steps:

a client node sends a key distribution request to a third party equipment through a first message, where the first message includes a variable parameter and is protected by a shared key Kas between the client node and a verification server;

after receiving the first message, the third party equipment sends a key distribution request to the verification server through a second message;

after receiving the second message, the verification server computes a shared key Kab between the client node and the third party equipment by using keying materials including the variable parameter, and sends a key distribution response to the third party equipment through a third message, where the third message includes Kab and the keying materials;

after receiving the third message, the third party equipment acquires the Kab, and forwards the keying materials to the client node; and after receiving the keying materials, the client node computes the Kab by using the keying materials in a method the same as that used by the verification server.

A system for key distribution, including a client node, a third party equipment and a verification server, where the client node is configured to send a key distribution request to the third party equipment by a first message, and after receiving keying materials forwarded by the third party equipment, compute a shared key Kab between the client node and the third party equipment by using the keying materials in a method same as that for the verification server;

the third party equipment is configured to, after receiving the first message sent by the client node, send a key distribution request to the verification server by a second message; after receiving a key distribution response sent by the verification server, acquire the Kab included in the key distribution response, and forward the keying materials included in the key distribution response to the client node; and the verification server is configured to, after receiving the second message sent by the third party equipment, compute the shared key Kab between the client node and the third party equipment by using the keying materials including a variable parameter, and send the third party equipment the key distribution response including the Kab and the keying materials.

A verification server, including a receiving unit, a computing unit and a sending unit, where the receiving unit is configured to receive a key distribution request sent by a third party equipment;

the computing unit is configured to compute a shared key Kab between a client node and the third party equipment by using keying materials including a variable parameter, after the receiving unit receives the key distribution request; and the sending unit is configured to send to the third party equipment a key distribution response including the Kab and the keying materials.

A client node, including: a temporary value generating unit, a sending unit, a keying material receiving unit and a computing unit, where the temporary value generating unit is configured to generate a temporary value;

the sending unit is configured to send to a third party equipment a key distribution request carrying the temporary value generated by the temporary value generating unit;

the keying material receiving unit is configured to receive the keying materials forwarded by the third party equipment; and the computing unit is configured to compute a shared key Kab between the client node and the third party equipment, by using the keying materials received by the keying material receiving unit in a method the same as that used by a verification server.

A method for key distribution, including the following steps:

a client node sends to a third party equipment a first message including a cryptology parameter and a client node public key PKa generated according to the cryptology parameter and a private key x of the client node, and gives a security protection to the first message; after receiving the first message, the third party equipment sends to a verification server a second message including the first message and a third party equipment public key PKb generated according to the cryptology parameter and a private key y of the third party equipment, and gives a security protection to the second message;

the verification server carries out a security verification for the second message and the first message included in the second message, and if the verification succeeds, sends to the third party equipment a response message including the PKa and the PKb, and gives a security protection to the content of the response message;

the third party equipment carries out a security verification for the received response message, and if the verification succeeds, computes a shared key Kab between the client node and the third party equipment by using the PKa or the PKb and the private key y of the third party equipment in a preset first mode, and sends to the client node the response message including the PKa or the PKb; the client node carries out a security verification for the received response message including the PKa or the PKb, and if the verification succeeds, computes the Kab by using the PKa or the PKb and the private key x of the client node in a preset second mode;

where the Kab computed in the first mode is the same as that computed in the second mode.

A system for key distribution, including a client node, a third party equipment and a verification server, where the client node is configured to send to the third party equipment a first message including a cryptology parameter and a client node public key PKa generated according to the cryptology parameter and a private key x of the client node, and give a security protection to the first message; carry out a security verification for the response message including the PKa or a PKb sent by the third party equipment, and if the verification succeeds, compute a Kab by using the PKa or the PKb and the private key x of the client node in a preset second mode;

the third party equipment is configured to, after receiving the first message, send a second message including the first message and a third party equipment public key PKb generated according to the cryptology parameter and a private key y of the third party equipment, and give a security protection to the second message; carry out a security verification for the response message sent by the verification server, and if the verification succeeds, compute a shared key Kab between the client node and the third party equipment by using the PKa or the PKb and the private key y of the third party equipment in a preset first mode; and send the response message including the PKa or the PKb to the client node; and the verification server is configured to carry out a security verification for the received second message and the first message included in the second message, and if the verification succeeds, send to the third party equipment a response message including the PKa and the PKb, and give a security protection to the content of the response message.

A verification server, including: a receiving unit, a security verification unit, a sending unit and a security protection unit;

the receiving unit is configured to receive a second message including a client node public key PKa and a third party equipment public key PKb sent by a third party equipment;

the security verification unit is configured to carry out a security verification for the second message received by the receiving unit and a first message included in the second message;

the sending unit is configured to send to the third party equipment a response message including the client node public key PKa and the third party equipment public key PKb, after the verification carried out by the security verification unit succeeds; and the security protection unit is configured to give a security protection to the response message sent by the sending unit.

A third party equipment, including: a receiving unit, a sending unit and a computing unit, where the receiving unit is configured to receive a first message sent by a client node and a response message sent by a verification server;

the sending unit is configured to, after the receiving unit receives the first message, send to the verification server a second message including the first message and a third party equipment public key PKb generated according to a cryptology parameter and a private key y of the third party equipment, and send to the client node the response message including a client node public key PKa and the third party equipment public key PKb received from the verification server by the receiving unit; and the computing unit is configured to, after the receiving unit receives the response message including the client node public key PKa and the third party equipment public key PKb, compute a shared key Kab between the client node and the third party equipment by using the PKa or the PKb and the private key y of the third party equipment.

A client node, including: a sending unit, a receiving unit and a computing unit, where the sending unit is configured to send to a third party equipment a first message including a cryptology parameter and a client node public key PKa generated according to the cryptology parameter and a private key x of the client node;

the receiving unit is configured to receive a response message including the PKa or a PKb sent by the third party equipment; and the computing unit is configured to, after the receiving unit receives the response message, compute a shared key Kab between the client node and the third party equipment by using the PKa or the PKb and the private key x of the client node.

As compared with the prior art, the embodiments of the present invention have the following advantages:

In the first method, system and equipment provided by the embodiments of the present invention, the client node sends a first key distribution request to a third party equipment; after receiving the first key distribution request, the third party equipment sends a second key distribution request to a verification server; after receiving the second key distribution request, the verification server computes a shared key Kab between the client node and the third party equipment by using keying materials including a variable parameter, and sends to the third party equipment a key distribution response including the Kab and the keying materials; after receiving the key distribution response, the third party equipment acquires the Kab, and forwards the keying materials for generating the Kab to the client node; after receiving the keying materials, the client node computes the Kab by using the keying materials in a method the same as that used by the verification server. In this way, the verification server introduces the variable parameter into the keying materials to compute the Kab, instead of using constant parameter, thus once the Kab is leaked, the Kab can be duly updated by using the variable parameter, and hence the security of message transmission is improved; furthermore, the verification server provides the keying materials to the client node, so that the client node can compute the Kab by using the keying materials in the same key computation method, and then the security of message transmission is further improved.

In the second method, system and equipment provided by the embodiments of the present invention, the client node and the third party equipment generate their respective public keys according to the same cryptology parameter and private keys of themselves, and send the public keys to the verification server to carry out a security verification, and when the verification succeeds, the client node and the third party equipment generate the same shared key Kab, by using the client node public key or the third party equipment public key included in a response returned by the verification server and the private keys of themselves, in a preset mode. The method introduces variable private key during the computation of the Kab, instead of using constant parameter, thus once the Kab is leaked, the Kab can be duly updated by using the variable private key, and hence the security of message transmission is improved.

DETAILED DESCRIPTION OF THE INVENTION

In order to make the object, technical solutions and advantages of the present invention clearer, the present invention is described in detail as follows with reference to the drawings and embodiments.

Figure 2:
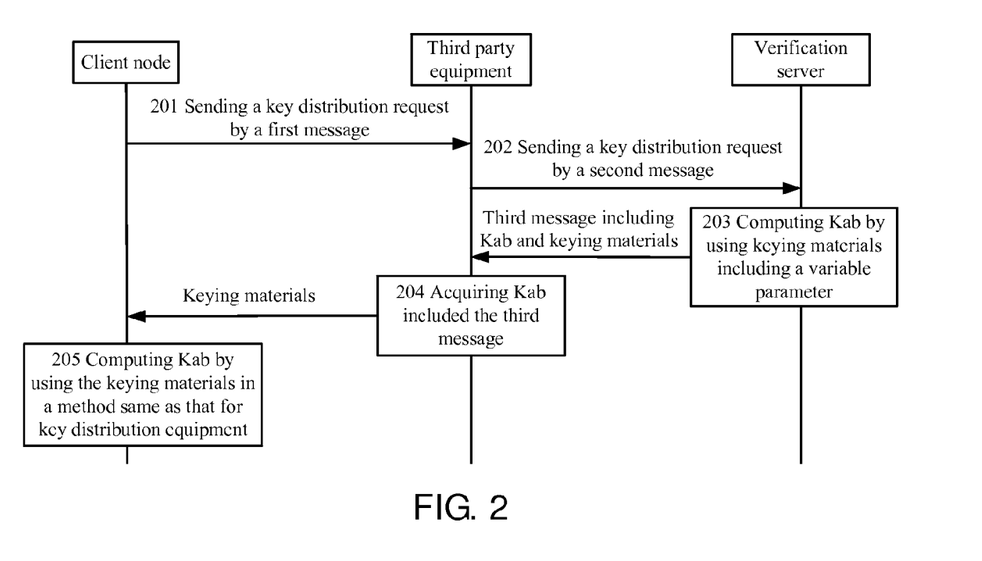
FIG. 2 is a flowchart of a first major method according to an embodiment of the present invention.

FIG. 2 is a flowchart of a first major method according to an embodiment of the present invention. In this method, a shared key between a client node and a verification server is denoted as Kas, a shared key between a third party equipment and the verification server is denoted as Kbs, and the verification server needs to distribute to the client node and the third party equipment a shared key Kab between the client node and the third party equipment, where the Kas may be one or more shared passwords or shared keys, or other shared keys derived from the shared keys. As shown in FIG. 2, the method includes:

Step 201: A client node sends a key distribution request to a third party equipment through a first message.

The first message may include a client node identification IDa and a third party equipment identification IDb, and may further include information such as temporary value generated by the client node, etc.

In addition, the first message is under a security protection by a shared key between the client node and a verification server. The client node may generate an integrity verification code of the first message, which is denoted as MIC 1, by using the shared key Kas between the client node and the verification server, or encrypt the first message with the Kas, where the temporary value generated by the client node may be information such as a random number, a serial number or a time stamp, etc.

Step 202: After receiving the key distribution request sent by the client node, the third party equipment sends a key distribution request to the verification server by a second message.

The second message may include a client node identification IDa, a third party equipment identification IDb and the first message, and may further include temporary value generated by the third party equipment, where the temporary value generated by the third party equipment may be a random number or a time stamp.

In this step, the third party equipment may generate an integrity verification code of the second message, which is denoted as MIC 2, by using the shared key Kbs between the third party equipment and the verification server, or encrypt the second message.

Step 203: The verification server computes a shared key Kab between the client node and the third party equipment by using keying materials including the variable parameter, and sends a key distribution response to the third party equipment by a third message including the Kab and the keying materials.

After receiving the second message sent by the third party equipment, the verification server carries out a message integrity verification for MIC 2 by using the shared key Kbs between the verification server and the third party equipment, carries out a message integrity verification for MIC 1 by using the shared key Kas between the verification server and the client node, and generate the Kab if both verifications succeed; or returns a verification failure message to the third party equipment if any one of the verifications does not succeed. If the client node and the third party equipment encrypt the first message and the second message respectively, the verification server firstly decrypts the first message and the second message, and may also verify the identifications of the client node and the third party equipment; if both the decryption and the verification succeed, the verification server generates a key distribution response message including the Kab and the keying materials and sends it to the third party equipment.

In this step, when the verification server generates the Kab, one of the temporary values, i.e., Na generated by the client node, Nb generated by the third party equipment and Ns generated by the verification server, or an arbitrary combination thereof, may be used as the variable parameter in the keying materials to generate the Kab. Thus the Kab may be computed in the following methods:

Kab=KDF (Kas, Label|Ida|I Db|Na), or,
Kab=KDF (Kas, Label|IDa|IDb|Nb), or,
Kab=KDF (Kas, Label|IDa|IDb|Ns), or,
Kab=KDF (Kas, Label|Ida|IDb|Na|Nb), or,
Kab=KDF (Kas, Label|Ida|IDb|Na|Ns), or,
Kab=KDF (Kas, Label|Ida|IDb|Nb|Ns), or,
Kab=KDF (Kas, Label|Ida|IDb|Na|Nb|Ns), where KDF is a key generation function, Label is a preset character string related to the purpose of Kab, and | is a connector.

In addition, Kab lifetime K_Lifetime, Kab length K_Length, etc. may also be used as the keying material to generate the Kab, e.g. Kab=KDF (Kas, Label↑Ida↑IDb|K_Lifetime|K_Length|Na), and so on.

In the third message sent to the third party equipment, the keying materials for generating the Kab may be included in a first portion of information of the third message, and the first portion of information may also include the value Na; the first portion of information may generate a MIC 3 by using the shared key Kas between the verification server and the client node, or be encrypted with the Kas. The Kab may be included in a second portion of information of the third message, and if the third party equipment generates the temporary value Nb in step 202, the second portion of information may also include the Nb or a value generated via a certain operation of the Nb, such as Nb+1. An integrity verification code of the whole message, which is denoted as MIC 4, may be generated by using the shared key Kbs between the verification server and the third party equipment; or the third message may be wholly encrypted with the Kbs.

Step 204: After receiving the third message sent by the verification server, the third party equipment acquires the Kab included therein, and forwards the keying materials for generating the Kab to the client node.

In this step, the portion including the keying materials is denoted as Key_Auth_Msg, which may be a message to which the verification server gives a security protection by using the Kas.

In this step, the third party equipment may firstly decrypt a portion of the third message encrypted with the Kbs, or firstly carry out an integrity verification for the MIC 4 in the third message; when the verification succeeds, the third party equipment acquires the Kab and forwards the Key_Auth_Msg including the keying materials to the client node. The message forwarded to the client node may also carry a message verification code MIC 5 generated by the third party equipment by using the Kab, which may be an integrity verification code generated by taking the Key_Auth_Msg as an input, or an integrity verification code generated with respect to a portion of the Key_Auth_Msg, such as one of Na, IDa, IDb and MIC 3 or an arbitrary combination thereof, and the integrity verification code is denoted as MIC 5.

Step 205: After receiving the keying materials for generating the Kab forwarded by the third party equipment, the client node computes the shared key Kab between the client node and the third party equipment by using the keying materials in a method same as that used by the verification server.

In this step, a key computation method same as that used by the verification server may be preset in the client node.

After receiving the keying materials, the client node firstly carries out an integrity verification for the MIC 3 of the keying material by using the shared key Kas between the key distribution server and the client node if the verification server gives an integrity protection to the portion, and then uses the keying materials to compute the Kab if the verification succeeds; or the client node firstly decrypts the keying materials with the shared key Kas between the key distribution server and the client node if the verification server encrypts the portion, and then uses the keying materials to compute the Kab.

The above temporary values Na, Nb and Ns may be a random number, a serial number or a time stamp.

Furthermore, in the above method, the verification server may store the temporary value Na or Nb sent by the client node or the third party equipment each time, and extracts the IDa in the second message after receiving the second message sent by the third party equipment; if the message of the client node is received for the first time, the MIC 1 is verified, and if the verification succeeds, the Na is stored; if the message of the client node is received once more, the verification server may compare the Na included in the message with the Na previously sent by the user equipment and stored in the verification server, and execute the step of computing the Kab if the verification condition is satisfied. Thus, the security of message transmission is further improved, where: if the temporary value is a serial number incremented each time, the verification server judges that the verification condition is satisfied when the value Na received is greater than the value Na stored in the verification server and continue to compute the Kab; otherwise, the verification server refuses to compute the Kab. In addition, the third party equipment may also store the value Na sent by the client node, and carry out the security verification according to the value Na received and the value Na stored in the third party equipment when the first or third message is received. In addition, the client node may also store the value Na generated by itself, and firstly compare the value Na included in the keying materials with the value Na stored in the client node when the fourth message is received, and if the two values Na are the same, the verification succeeds.

Figure 3:
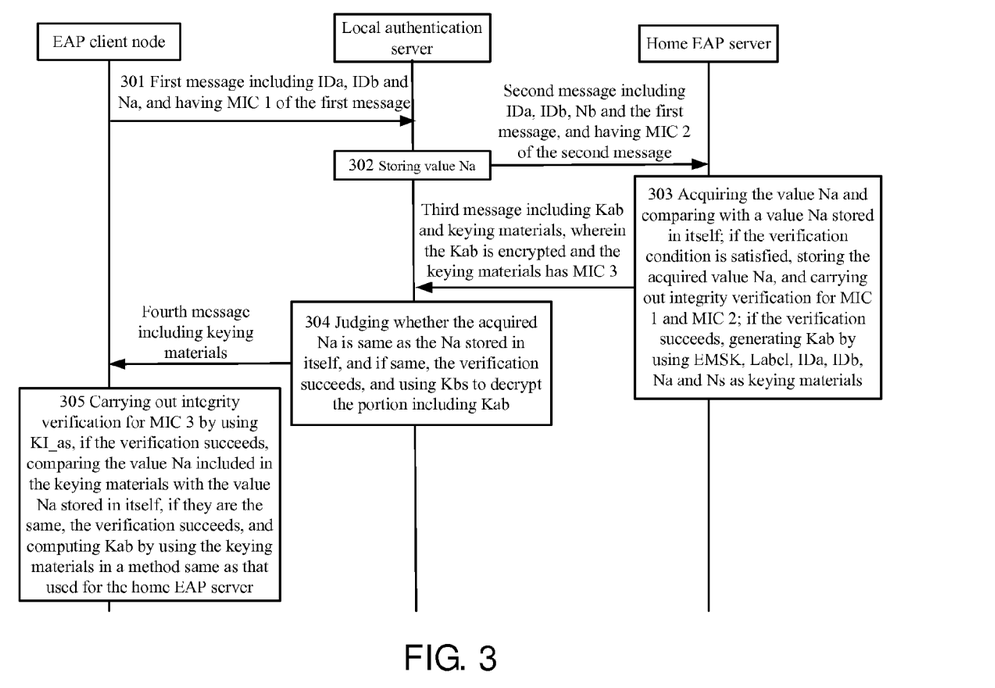
FIG. 3 is a flowchart of a first concrete method according to an embodiment of the present invention.

The above method will be described as follows with several embodiments. FIG. 3 is a flowchart of a first concrete method according to an embodiment of the present invention. In this method, the three parties in communications are an EAP client node, a local authentication server and a Home EAP server, which are corresponding to the client node, the third party equipment and the verification server, respectively. The EAP client node and the Home EAP server have been authenticated, a shared key has been generated, i.e., Extended Master Session Key (EMSK) and a shared key KI_as derived from the EMSK for protecting message integrity; when the EAP client node leaves the home domain, in order to reduce handover authentication delay, the Home EAP server shall distribute a shared key Kab to the EAP client node and the local authentication server, so that the EAP client node can use the shared key Kab for an authentication with the local authentication server, when the EAP client node carries out a re-authentication at the visited location. As shown in FIG. 3, the method includes:

Step 301: The EAP client node sends a key distribution request to the local authentication server by a first message. The first message includes EAP client node identification IDa, local authentication server identification IDb, and temporary value Na generated by the EAP client node, and an integrity verification code of the first message, which is denoted as MIC 1, is generated with a shared key KI_as between the EAP client node and the Home EAP server.

Step 302: After receiving the first message, the local authentication server stores the value Na, and sends a key distribution request to the Home EAP server by a second message. The second message includes EAP client node identification IDa, local authentication server identification IDb, temporary value Nb generated by the local authentication server, and the first message, and an integrity verification code of the second message is generated with a shared key Kbs between the local authentication server and the Home EAP server, or the integrity verification code denoted as MIC 2 is generated by using the Kbs, the Nb, the IDa and the IDb and the MIC 1.

Step 303: After receiving the second message, the Home EAP server carries out an integrity verification for the MIC 1 and the MIC 2 in the second message, and if the verification succeeds, uses Label, IDa, IDb and variable parameters Na, Nb as keying materials, uses the EMSK to generate a shared key Kab between the EAP client node and the local authentication server, i.e., Kab=KDF (EMSK, Label|Ida|IDb|Na|Nb), and sends to the local authentication server a third message including two portions; where one portion includes Kab, IDa, IDb, Na and Nb, and the portion including the Kab is encrypted with the Kbs, the other portion includes Kas, Label, IDa, IDb and Na, and an integrity verification code, which is denoted as MIC 3, of the portion including the keying materials is generated with the shared key KI_as between the client node and the Home server.

Or the third message includes the Kab encrypted with the Kbs, and also includes Na, Nb, IDa, IDb and key verification authorization message Key_Auth_Msg, which includes keying materials, for the client node; as a response to the first message by the server, the third message includes information such as keying materials for generating the Kab, lifetime, and integrity verification code generated by using KI_as, and an integrity verification code of the whole message is generated by using the Kbs.

Or the third message includes the Kab and key verification authorization message Key_Auth_Msg, which includes keying materials, for the client node; as a response to the first message by the server, the Key_Auth_Msg includes information such as keying materials for generating the Kab, lifetime, and integrity verification code generated by using KI_as, and the whole message is encrypted with the Kbs.

Step 304: After receiving the third message, the local authentication server decrypts with the Kbs, and judges whether the Na and Nb included in the third message are same as the Na and Nb stored in the local authentication server; if the Na and Nb included in the third message is different from the Na and Nb stored in the local authentication server, the verification fails, and the local authentication server sends a failure message to the key distribution server and the client node; and if the Na and Nb included in the third message are same as the Na and Nb stored in the local authentication server, the verification succeeds, and the local authentication server forwards the portion including the keying materials to the EAP client node by the fourth message. In addition, the local authentication server may generate an integrity verification code, which is denoted as MIC 4, of the fourth message by using the Kab, or encrypt information such as the Na, IDa, IDb etc. with the Kab.

Preferably, the third message may include a specially processed Na such as Na+1; the local authentication server carries out an inverse processing for the specially processed Na, i.e. Na+1−1, and compares a result of the inverse processing with the Na stored in the local authentication server; if the result of the inverse processing is the same as the Na stored in the local authentication server, the verification succeeds, and thus the message security can be further ensured.

Step 305: After receiving the fourth message, the EAP client node carries out an integrity verification for the MIC 3 of the portion including the keying materials by using KI_as, and compares the value Na included in the keying materials with the value Na stored in the EAP client node; if the verification succeeds, computes the shared key Kab between the EAP client node and the third party equipment by using the keying materials in a method same as that for the Home EAP server, and verifies the MIC 4 with the Kab.

Similarly, the portion including Kab may also include a specially processed Na such as Na+1; the EAP client node may carry out an inverse processing for the specially processed Na, and compares a result of the inverse processing with the Na stored in the EAP client node; if the result of the inverse processing is the sane as the Na stored in the EAP client node, the verification succeeds.

Figure 4:
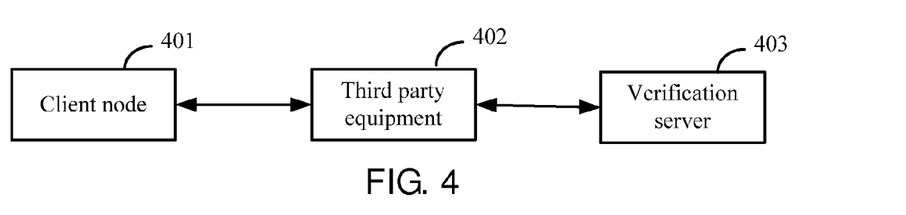
FIG. 4 is a structural diagram of a first system according to an embodiment of the present invention.

FIG. 4 is a structural diagram of a first system according to an embodiment of the present invention. As shown in FIG. 4, the system includes a client node 401, a third party equipment 402 and a verification server 403.

The client node 401 is configured to send a key distribution request to the third party equipment 402 through a first message, and after receiving keying materials forwarded by the third party equipment 402, compute the Kab by using the keying materials in a method the same as that used by the verification server 403.

The third party equipment 402 is configured to, after receiving the first message sent by the client node 401, send a key distribution request to the verification server 403 by a second message; after receiving a key distribution response sent by the verification server 403, acquire the Kab included in the key distribution response, and forwarding the keying materials in the key distribution response to the client node 401.

The verification server 403 is configured to, after receiving the second message sent by the third party equipment 402, compute the shared key Kab between the client node 401 and the third party equipment 402 by using the keying materials including a variable parameter, and send the third party equipment 402 the key distribution response including the Kab and the keying materials.

In addition, the client node 401 may be further configured to give a security protection to the first message by using the shared key Kas between the client node 401 and the verification server 403.

The third party equipment 402 may be further configured to give a security protection to the second message by using the shared key Kbs between the third party equipment 402 and the verification server 403.

The verification server 403 may be further configured to carry out a security verification for the second message by using the Kbs, and carry out a security verification for the first message included in the second message by using the Kas.

The verification server 403 may be further configured to give a security protection to a portion including the keying materials in the key distribution response by using the shared key Kas between the verification server 403 and the client node 401, and give a security protection to a portion including the Kab in the key distribution response by using the shared key Kbs between the verification server 403 and the third party equipment 402.

The third party equipment 402 may be further configured to carry out a security verification for a portion including the Kab in the received key distribution response, by using the Kbs.

The client node 401 may be further configured to carry out a security verification for the received keying materials by using the Kas.

In addition, the third party equipment 402 may be further configured to generate an integrity verification code, which is denoted as MIC 5, for the portion including the keying materials by using the acquired Kab.

The client node 401 may be further configured to carry out an integrity verification for the MIC 5 by using the Kab after the Kab is computed: if the verification fails, send a failure message to the third party equipment 402; and if the verification succeeds, acknowledge that the computed Kab is secure.

Figure 5:
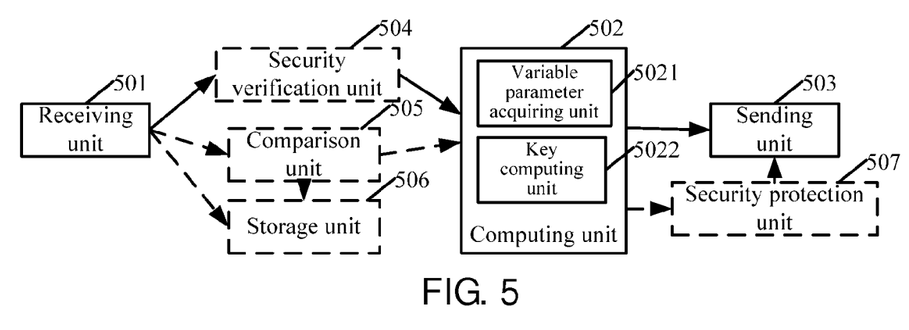
FIG. 5 is a structural diagram of a verification server according to an embodiment of the present invention.

FIG. 5 is a structural diagram of a first verification server according to an embodiment of the present invention. As shown in FIG. 5, the verification server includes: a receiving unit 501, a computing unit 502 and a sending unit 503, where the receiving unit 501 is configured to receive a key distribution request.

the computing unit 502 is configured to compute a shared key Kab between a client node and a third party equipment by using keying materials including a variable parameter, after the receiving unit 501 receives the key distribution request; and the sending unit 503 is configured to send a key distribution request including the Kab and the keying materials.

The verification server may further include: a security verification unit 504 configured to carry out a security verification for the key distribution request received by the receiving unit 501, and if the verification succeeds, the computing unit 502 is triggered to compute the Kab.

The verification server may further include: a comparison unit 505 and a storage unit 506.

The comparison unit 505 is configured to compare a temporary value included in the key distribution request received by the receiving unit 501 with a temporary value stored in the storage unit 506, if the verification condition is satisfied, the computing unit 502 is triggered to compute the Kab.

The storage unit 506 is configured to store the temporary value included in the key distribution request, when a comparison result of the comparison unit 505 satisfies the verification condition.

Preferably, the verification server may further include: a security protection unit 507 configured to give a security protection to a portion including the keying materials in the key distribution response, by using the shared key Kas between the client node and the verification server, and give a security protection to a portion including the Kab in the key distribution response, by using the shared key Kbs between the third party equipment and the verification server.

The computing unit 502 may include: a variable parameter acquiring unit 5021 and a key computing unit 5022.

The variable parameter acquiring unit 5021 is configured to acquire variable parameter including one of a temporary value Na generated by the client node, a temporary value Nb generated by the third party equipment, and a temporary value Ns generated by the verification server or an arbitrary combination thereof.

The key computing unit 5022 is configured to compute the Kab by using the keying materials including the variable parameter.

Figure 6:
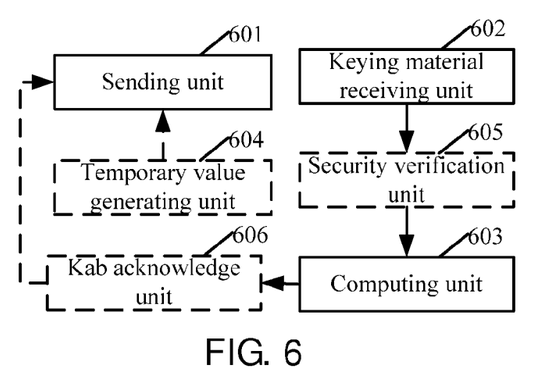
FIG. 6 is a structural diagram of a first client node according to an embodiment of the present invention.

FIG. 6 is a structural diagram of a first client node according to an embodiment of the present invention. As shown in FIG. 6, the client node includes a sending unit 601, a keying material receiving unit 602 and a computing unit 603.

The sending unit 601 is configured to send a key distribution request to a third party equipment.

The keying material receiving unit 602 is configured to receive the keying materials forwarded by the third party equipment.

The computing unit 603 is configured to compute a shared key Kab between the client node and the third party equipment, by using the keying materials received by the keying material receiving unit 602 in a method same as that for a verification server.

In addition, the client node may further include a temporary value generating unit 604 configured to generate a temporary value, and carry the temporary value in the key distribution request sent by the sending unit 601.

Preferably, the client node may further include: a security verification unit 605 configured to carry out a security verification for the keying materials received by the keying material receiving unit 602, by using a shared key Kas between the client node to which the security verification unit 605 belongs and the verification server, and if the verification succeeds, the computing unit 603 is triggered to compute the Kab.

Furthermore, the client node may further include a Kab acknowledging unit 606 configured to carry out a verification for an integrity verification code, which is denoted as MIC 5, of the keying materials by using the Kab computed by the computing unit 603, and if the verification succeeds, it is acknowledged that the Kab is secure.

The sending unit 601 is further configured to send a failure message to the third party equipment after the verification by the Kab acknowledging unit 606 fails.

Figure 7:
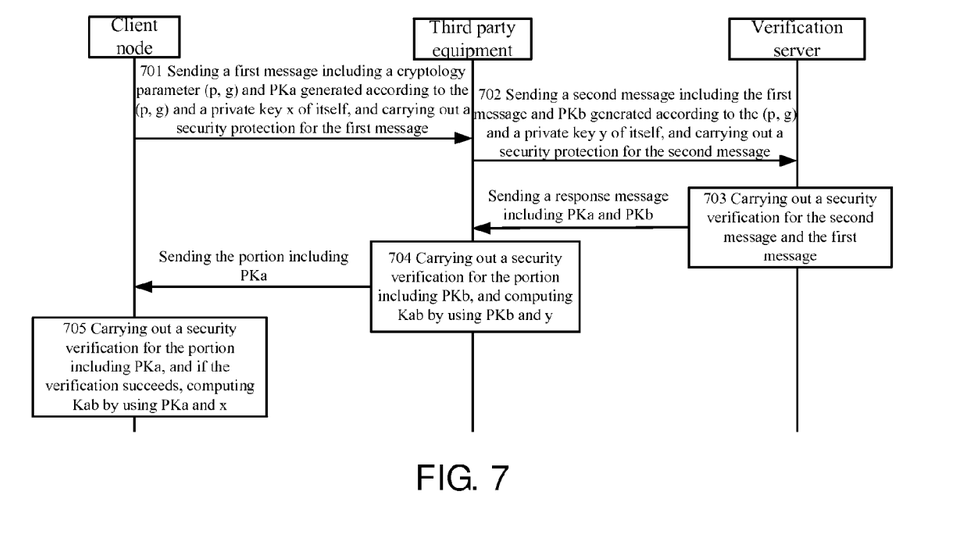
FIG. 7 is a flowchart of a second major method according to an embodiment of the present invention.

FIG. 7 is a flowchart of a second method according to an embodiment of the present invention. As shown in FIG. 7, the method includes Step 701: A client node sends to a third party equipment a first message including a cryptology parameter (p, g) and a client node public key PKa generated according to the cryptology parameter and a private key x of the client node, and gives a security protection to the first message by using a shared key Kas between the client node and the verification server.

In this step, the first message includes a client identification IDa and a third party equipment identification IDb; furthermore, messages transmitted in the following steps all include the IDa and the IDb, which will not be repeatedly pointed out.

In this step, the client node may be based on the Diffie-Hellman key exchange cryptology parameter (p, g) of discrete logarithm, where p is a prime number, g is a generator of finite domain $F_p$ and g<p. The client node may generate a public key PKa of itself according to the cryptology parameter (p, g) and the private key x of itself, i.e. PKa=$g^x$ mod p.

In this step, the first message may further include a temporary value Na generated by the client node.

The security protection for the first message may be generating a MIC 1 of the first message by using the shared key Kas between the client node and the verification server, or encrypting the first message by using the Kas.

Step 702: After receiving the first message, the third party equipment sends to a verification server a second message including the first message and a third party equipment public key PKb generated according to the cryptology parameter and a private key of the third party equipment, and gives a security protection to the second message by using the shared key Kbs between the third party equipment and the verification server.

In this step, the third party equipment acquires the cryptology parameter from the first message, and generates a public key PKb of itself by using the cryptology parameter (p, g) and the private key y of itself, i.e., $PKb=g^y \bmod p$.

In addition, after receiving the first message, the third party equipment may further store the value Na included in the first message. The second message may also include a temporary value Nb generated by the third party equipment.

In this step, the security protection for the second message may be generating a integrity verification code MIC 2 of the second message by using the shared key Kbs between the third party equipment and the verification server, or generating the MIC 2 for a portion in the second message which does not include the first message; the security protection may also be encrypting the second message by using the Kbs, or encrypting the portion in the second message which does not include the first message.

Step 703: After receiving the second message, the verification server carries out a security verification for the second message and the first message included therein, and if the verification succeeds, sends to the third party equipment a response message including the PKa and the PKb, gives a security protection to the portion including the PKa by using the shared key Kas between the client node and the verification server, and gives a security protection to the portion including the PKb by using the shared key Kbs between the third party equipment and the verification server.

The security protection may be generating MIC 3 for the portion including the PKa by using the Kas, or encrypting the portion; generating MIC 4 for the portion including the PKb by using the Kbs, or encrypting the portion. The portion including the PKa may further include Na, Nb, IDa and IDb, etc. and the portion including the PKb may further include Na, Nb, Da and IDb, etc.

In addition, before returning a response message, the verification server may compare a value Na included in the second message with a value Na stored by in the verification server, and if the verification condition is satisfied, stores the value Na received, and continues to return the response message.

In addition, the portion including the PKa in the response message may further include the Na or specially processed Na.

Step 704: After receiving the response message, the third party equipment carries out a security verification for the portion including the PKb by using the Kbs, and if the verification succeeds, computes the shared key Kab between the client node and the third party equipment by using the PKb and the private key y of the third party equipment in a preset mode, and forwards the portion including the PKa to the client node.

In this step, the third party equipment carries out the security verification of the portion including the PKb, which may be as follows: carrying out an integrity verification or decryption for the MIC 4 of the portion including the PKb by using the Kbs.

Where, computing the Kab in the preset mode may be as follows:

$$Kab=PKb^y \bmod p = g^{xy} \bmod p \qquad (1)$$

In addition, before computing the Kab, the third party equipment may compare the value Na included in the portion including the PKb with the value Na stored in third party equipment, and if the verification condition is satisfied, the verification succeeds, and the third party equipment continues to compute the Kab; or the third party equipment may carry out an inverse processing for the value obtained through a special processing for the Na included in the portion including the PKb, and compare the value obtained after the inverse processing with the value Na stored in the third party equipment, if the verification condition is satisfied, the verification succeeds, and the third party equipment continues to compute the Kab.

Step 705: The client node carries out a security verification of the received portion including the PKa, and computes the Kab by using the PKa and the private key x of the client node if the verification succeeds.

In this step, the client node carries out the security verification for the portion including the PKa, which may be as follows: carrying out an integrity verification or decryption for the MIC 3 of the portion including the PKa by using the Kas.

Where, computing the Kab in the preset mode may be as follows:

$$Kab=PKa^x \bmod p = g^{xy} \bmod p \qquad (2)$$

As can be seen from Equations (1) and (2), in this mode, the Kab computed by the third party equipment is same as that computed by the client node.

In addition, before computing the Kab, the client node may compare the value Na included in the portion including the PKa with the value Na stored in the client node, and if the verification is satisfied, the verification succeeds, the client node continues to compute the Kab; or the client node may carry out an inverse processing for the value obtained by a special processing for the value Na included in the portion including the PKa, and compare the value obtained after the inverse processing with the value Na stored in the client node, if the verification condition is satisfied, the verification succeeds, and the client node continues to compute the Kab.

In addition, in the above flows, the portion including PKa and the portion including PKb in the response message returned in step 703 may simultaneously include one of the Na, the Nb and a temporary value Ns generated by the verification server, or an arbitrary combination thereof. In steps 704 and 705, the values computed with equations (1) and (2) may be used as keying materials Master Key, i.e., the Master Key computed in step 704 is Master Key=$PKb^y \bmod p = g^{xy} \bmod p$, and the Master Key computed in step 705 is Master Key=$PKa^x \bmod p = g^{xy} \bmod p$. In steps 704 and 705, one of the Na, the Nb and the Ns or an arbitrary combination thereof, as well as the computed Master Keys, are still used as keying materials for generating the Kab. The equations for computing the Kab may be as follows:

Kab=KDF (Master Key, Label|IDa|IDb|Na), or
Kab=KDF (Master Key, Label|Ida|IDb|Nb), or
Kab=KDF (Master Key, Label|Ida|IDb|Ns), or
Kab=KDF (Master Key, Label|Ida|IDb|Na|Nb), or
Kab=KDF (Master Key, Label|Ida|IDb|Na|Ns), or
Kab=KDF (Master Key, Label|Ida|IDb|Nb|Ns), or Kab=KDF (Master Key, Label|Ida|IDb|Na|Nb|Ns), where, KDF is a key generation function, Label is a preset character string related to the purpose of the Kab, and | is a separator.

In addition, the key lifetime K_Lifetime, the key length K_Length, etc. may also be used as the keying materials for generating the Kab, e.g., Kab=KDF (Master Key, Label|Ida|IDb|K_Lifetime|K_Length|Na), etc.

In addition to the above Diffie-Hellman key exchange cryptology parameter (p, g) based on discrete logarithm, other cryptology parameter may be used, e.g. elliptic curve cryptosystem parameter (p, d, f, G, n) may be used, where p is a positive integer, d and f are positive integers in the finite domain $F_p$, G is a base point on an elliptic curve $E(F_p)$, n is a prime number and an order of the base point G, wherein an equation of the elliptic curve is y2=x3+dx+f.

When the elliptic curve cryptosystem parameter is used, the public key PKa generated in step 701 may be PKa=x×G, where x is smaller than n. In addition, the client node includes the generated public key PKa and the cryptology parameter (p, d, f, G, n) in the first message and send to the third party equipment. In step 702, the public key PKb generated by the third party equipment may be PKb=y×G, and similarly, y is smaller than n. In step 704, the method for computing the Kab is that the third party equipment computes the Kab by using the PKa and the private key y of the third party equipment, i.e., Master Key=y×PKa=y×x×G, and the Master Key may be taken as the Kab, or further used as the keying materials for generating the Kab. In step 705, the method for computing the Kab is that the client node computes the Kab by using the PKb and the private key x of the client node, i.e. Master Key=x× PKb=x×y×G, and the Master Key may be taken as the Kab, or further used as the keying materials for generating the Kab. It can be seen that whatever the cryptology parameter is used, the Master Keys respectively computed by the third party equipment and the client node by combining their own private keys in steps 704 and 705 must be ensured as the same.

Figure 8:
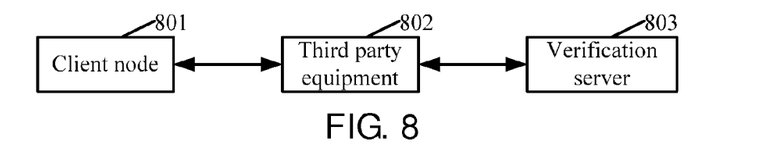
FIG. 8 is a structural diagram of a second system according to an embodiment of the present invention.

FIG. 8 is a structural diagram of a second system according to an embodiment of the present invention. As shown in FIG. 8, the system includes a client node 801, a third party equipment 802 and a verification server 803.

The client node 801 is configured to send to the third party equipment 802 a first message including a cryptology parameter and a public key Pka of the client node 801 generated according to the cryptology parameter and a private key x of the client node 801, and give a security protection to the first message; carry out a security verification for a response message including the PKa or the PKb sent by the third party equipment 802, and if the verification succeeds, compute a Kab by using the PKa or the PKb and the private key x of the client node 801 in a preset second mode.

The third party equipment 802 is configured to, after receiving the first message, send to the verification server 803 a second message including the first message and a public key PKb of the third party equipment 802 generated according to the cryptology parameter and the private key y of the third party equipment 802, and give a security protection to the second message; carry out a security verification for a response message sent by the verification server 803, and if the verification succeeds, compute the shared key Kab between the client node 801 and the third party equipment 802 by using the PKa or the PKb and the private key y of the third party equipment 802 in a preset first mode, and send a response message including the PKa or the PKb to the client node 801.

The verification server 803 is configured to carry out a security verification for the second message and the first message included in the second message, and if the verification succeeds, send to the third party equipment 802 the response message including the PKa and the PKb, and give a security protection to the content of the response message.

Figure 9:
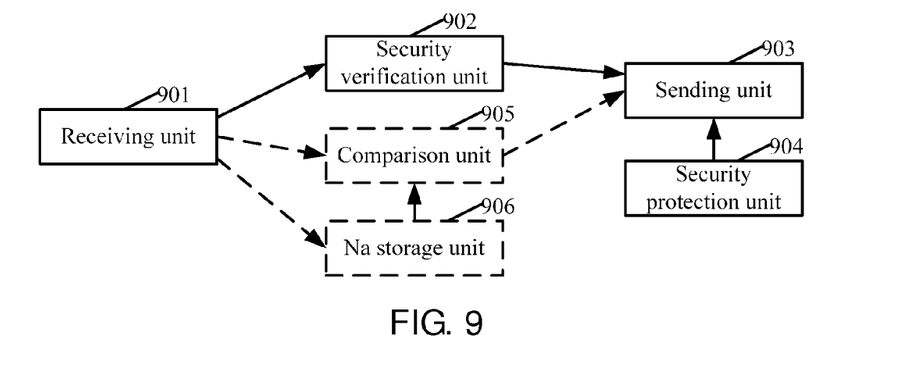
FIG. 9 is a structural diagram of a verification server according to an embodiment of the present invention.

FIG. 9 is a structural diagram of a second verification server according to an embodiment of the present invention. As shown in FIG. 9, the verification server includes a receiving unit 901, a security verification unit 902, a sending unit 903 and a security protection unit 904.

The receiving unit 901 is configured to receive a second message including a client node public key PKa and a third party equipment public key PKb sent by a third party equipment.

The security verification unit 902 is configured to carry out a security verification for the second message received by the receiving unit 901 and a first message included in the second message.

The sending unit 903 is configured to send to the third party equipment a response message including the client node public key PKa and the third party equipment public key PKb, after the verification carried out by the security verification unit 902 succeeds;

The security protection unit 904 is configured to give a security protection for the response message sent by the sending unit 903.

The verification server may further include a comparison unit 905 and a Na storage unit 906.

The comparison unit 905 is configured to compare a temporary value Na included in the second message received by the receiving unit 901 with a value Na stored in the Na storage unit 906, if the verification condition is satisfied, the sending unit 903 is triggered to send the response message, and if the verification condition is not satisfied, the sending unit 903 is prohibited to send the response message.

The Na storage unit 906 is configured to store the Na included in the second message, when a comparison result of the comparison unit 905 satisfies the verification condition.

Figure 10:
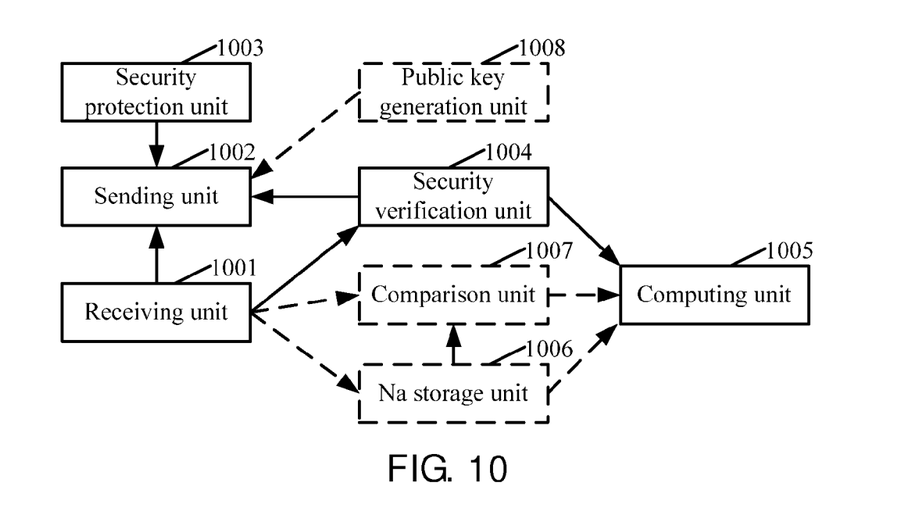
FIG. 10 is a structural diagram of a third party equipment according to an embodiment of the present invention.

FIG. 10 is a structural diagram of a third party equipment according to an embodiment of the present invention. As shown in FIG. 10, the third party equipment includes a receiving unit 1001, a sending unit 1002, a security protection unit 1003, a security verification unit 1004 and a computing unit 1005.

The receiving unit 1001 is configured to receive a first message sent by a client node and a response message sent by a verification server.

The sending unit 1002 is configured to, after the receiving unit 1001 receives the first message, send to the verification server a second message including the first message and a third party equipment public key PKb generated according to a cryptology parameter and a private key y of the third party equipment, and send to the client node the response message including a client node public key PKa and the PKb, after the verification by the security verification unit 1004 succeeds.

The security protection unit 1003 is configured to give a security protection to the second message sent by the sending unit 1002.

The security verification unit 1004 is configured to carry out a security verification for the response message received by the receiving unit 1001.

The computing unit 1005 is configured to, after the verification by the security verification unit 1004 succeeds, compute a shared key Kab between the client node and the third party equipment by using the PKa or the PKb and the private key y of the third party equipment in a preset first mode.

The third party equipment may further include a Na storage unit 1006 and a comparison unit 1007.

The Na storage unit 1006 is configured to store a value Na included in the first message.

The comparison unit 1007 is configured to compare a value Na included in the response message with the value Na stored by the Na storage unit 1006, and: if the verification condition is satisfied, the computing unit 1005 is triggered to compute the Kab; if the verification condition is not satisfied, the computing unit 1005 is prohibited to compute the Kab.

The third party equipment may further include a public key generation unit 1008 for generating the third party equipment public key PKb by using a cryptology parameter included in the first message and the private key y of the third party equipment.

Figure 11:
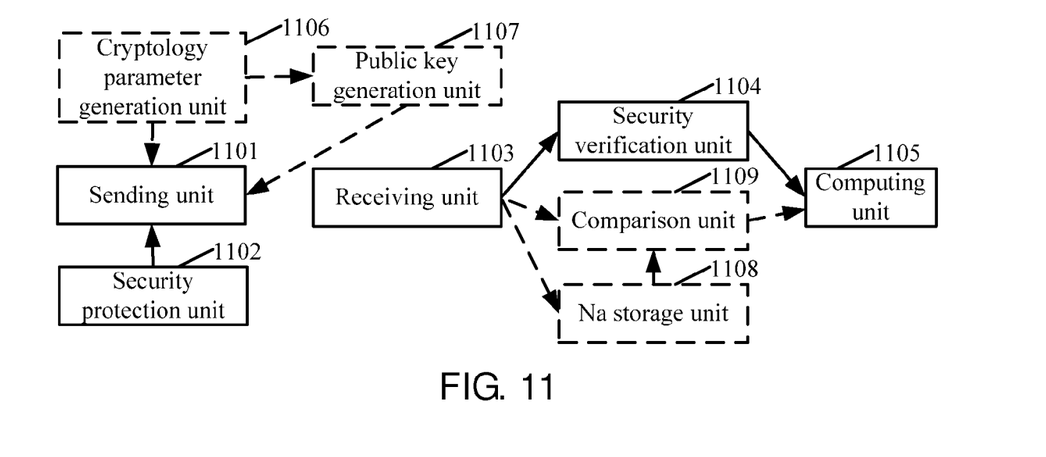
FIG. 11 is a structural diagram of a second client node according to an embodiment of the present invention.

FIG. 11 is a structural diagram of a second client node according to an embodiment of the present invention. As shown in FIG. 11, the client node includes a sending unit 1101, a security protection unit 1102, a receiving unit 1103, a security verification unit 1104 and a computing unit 1105.

The sending unit 1101 is configured to send to a third party equipment a first message including a cryptology parameter and a client node public key PKa generated according to the cryptology parameter and a private key x of the client node.

The security protection unit 1102 is configured to give a security protection to the first message sent by the sending unit 1101.

The receiving unit 1103 is configured to receive a response message including the PKa or a PKb sent by the third party equipment.

The security verification unit 1104 is configured to carry out a security verification for the response message received by the receiving unit 1103.

The computing unit 1105 is configured to, after the verification by the security verification unit 1104 succeeds, compute a shared key Kab between the client node and the third party equipment by using the PKa or the PKb and the private key x of the client node in a preset second mode.

The client node may further include a cryptology parameter generation unit 1106 and a public key generation unit 1107.

The cryptology parameter generation unit 1106 is configured to generate a cryptology parameter.

The public key generation unit 1107 is configured to generate a client node public key PKa according to the cryptology parameter generated by the cryptology parameter generation unit 1106 and a private key x of the client node.

The client node may further include a Na storage unit 1108 and a comparison unit 1109.

The Na storage unit 1108 is configured to store a value Na generated by the client node.

The comparison unit 1109 is configured to compare a temporary value Na included in the response message with a value Na stored in the Na storage unit 1108, and: if the verification condition is satisfied, the computing unit 1005 is triggered to compute the Kab; otherwise, the computing unit 1005 is prohibited to compute the Kab.

As can be seen from the above descriptions, in the first method, system and equipment provided by the embodiments of the present invention, the client node sends a first key distribution request to the third party equipment; after receiving the first key distribution request, the third party equipment sends a second key distribution request to the verification server; after receiving the second key distribution request, the verification server computes a shared key Kab between the client node and the third party equipment by using keying materials including variable parameter, and sends to the third party equipment a key distribution response including the Kab and the keying materials; after receiving the key distribution response, the third party equipment acquires the Kab, and forwards the keying materials to the client node; after receiving the keying materials, the client node computes the Kab by using the keying materials in a method the same as that used by the verification server. In this way, the verification server introduces the variable parameter into the keying materials to compute the Kab, instead of just using constant parameter, thus once the Kab is leaked, the Kab may also be duly updated by using the variable parameter, and hence the security of message transmission is improved; furthermore, the verification server provides the keying materials to the client node, so that the client node can compute the Kab by using the keying materials in the same key computation method, and the security of message transmission is further improved. In addition, when forwarding the keying materials to the client node, the third party equipment can simultaneously use the Kab to generate the MIC of the keying materials; after computing the Kab by using the keying materials, the client node can use the Kab to verify the MIC, so as to acknowledge that the third party equipment receives the Kab, thus the security of key distribution is enhanced.

In the second method, system and equipment provided by the embodiments of the present invention, the client node and the third party equipment generate their respective public keys according to the same cryptology parameter and private keys of themselves, and send the public keys to the verification server to carry out a security verification, and when the verification succeeds, the client node and the third party equipment generate the same shared key Kab, by using the public key of the client node or the public key of the third party equipment included in a response returned by the verification server and the private keys of themselves, in a preset mode. The method introduces variable private key during the computation of the Kab, instead of just using constant parameter, thus once the Kab is leaked, the Kab may be duly updated by using the variable private key, and hence the security of message transmission is improved. Furthermore, temporary values generated by the respective devices may be used as variable keying materials for computing the Kab, so that the Kab can be updated more conveniently, and the security of message transmission is improved.

In addition, the embodiments of the present invention combine multiple security measures for preventing key leakage and replay attack, e.g. carrying out encryption and generating integrity verification code for the sent key distribution request and key distribution response, comparing the received temporary value with the temporary value stored by itself, etc. so as to improve the security of message transmission.

With the descriptions of the above embodiments, a person skilled in the art can clearly understand that the present invention can be implemented either by hardware, or by a combination of software and necessary general hardware platform. Based on such understanding, the technical solution of the present invention can be reflected in a form of software product, and the software product may be stored in a non-volatile storage medium (CD-ROM, U disk, mobile hard disk, etc.), including several instructions for enabling a computer device (personal computer, server, network device, etc.) to execute the methods in respective embodiments of the present invention.

In summary, the above descriptions are just some exemplary embodiments of the present invention, and are not limitations to the present invention. Any modification, equivalent replacement, improvement, etc. made without deviating from the spirit and principle of the present invention shall fall into the protection scope of the present invention.

What is claimed is:

1. A method for key distribution, comprising:

sending, by a client node, a key distribution request to a third party equipment by way of a first message comprising a first serial number generated by the client node and encrypted by a first shared key between the client node and a verification server;

after receiving the first message, sending, by the third party equipment, the key distribution request to the verification server by way of a second message; wherein the second message comprises the first message;

after receiving the second message, computing, by the verification server, a second shared key between the client node and the third party equipment by using keying materials comprising a second serial number generated by the verification server, and sending a key distribution response to the third party equipment by way of a third message comprising the second shared key and the keying materials; wherein the first serial number is included in a first portion of the third message;

after receiving the third message, acquiring by the third party equipment the second shared key, and forwarding the keying materials to the client node by way of a fourth message; wherein the first serial number is included in the fourth message; and after receiving the keying materials, computing, by the client node, the second shared key by using the keying materials in a same method as the one used by the verification server, wherein before computing the second shared key between the client node and the third party equipment, the verification server acquires the first serial number included in the second message, compares the first serial number acquired with a third serial number stored in the verification server, and if the verification condition is satisfied, the verification server stores the first serial number acquired, and continues to compute the second shared key between the client node and the third party equipment, after receiving the first message, the third party equipment stores the first serial number sent by the client node, and when the third message is received, the third party equipment acquires the first serial number included in the third message, compares the first serial number acquired and the first serial number stored in the third party equipment, and forwards the keying materials to the client node if the first serial number acquired is the same as the first serial number stored in the third party equipment, and when receiving the keying materials, the client node compares the first serial number included in the fourth message with the first serial number stored in the client node, and if the two serial numbers are the same, the client node computes the second shared key between the client node and the third party equipment.

2. The method according to claim 1, wherein
the first message and the second message comprise an identification of the client node and an identification of the third party equipment.

3. The method according to claim 2, wherein
the second message is encrypted by using a third shared key between the third party equipment and the verification server;
before computing the second shared key, the method further comprises at least one of the following steps: (a) performing by the verification server a security verification for the first message by using the first shared key, and (b) performing a security verification for the second message by using the third shared key, and
if the verification succeeds, continuing by the verification server to compute the second shared key.

4. The method according to claim 1, wherein
the third message comprises the first portion and a second portion, wherein the first portion comprises the second shared key, the identification of the client node and the identification of the third party equipment, and a second portion comprises the keying materials;
the method further comprises at least one of the following steps:
(a) giving, by the verification server, a first encryption to the first portion of the third message by using a third shared key between the third party equipment and the verification server; before acquiring the second shared key, performing by the third party equipment a security verification for the first portion by using the third shared key between the third party equipment and the verification server; and
(b) giving, by the verification server, a second encryption to the second portion of the key distribution response by using the first shared key; before computing the second shared key, performing by the client node a security verification for the second portion by using the first shared key.

5. The method according to claim 4, wherein
giving the encryption comprises: generating an integrity verification code MIC; and carrying out the security verification comprising: carrying out a message integrity verification for the MIC.

6. The method according to claim 3, wherein
giving the encryption comprises: generating an integrity verification code MIC; and carrying out the security verification comprising: carrying out a message integrity verification for the MIC.

7. The method according to claim 1, further comprising:
after acquiring the second shared key, generating by the third party equipment an integrity verification code of the keying materials by using the second shared key, and forwarding the integrity verification code to the client node together with the keying materials;
after computing the second shared key, performing, by the client node, a verification for the integrity verification code of the keying materials by using the computed second shared key, if the verification fails, returning by the client node a failure message to the third party equipment.

8. A system for key distribution, comprising a client node, a third party equipment and a verification server;
the client node is configured to send a key distribution request to the third party equipment by a first message which comprises a first serial number generated by the client node and is encrypted by using a first shared key between the client node and the verification server, and after receiving keying materials forwarded by the third party equipment, compute a second shared key between the client node and the third party equipment by using the keying materials in a same method as the one used by the verification server;
the third party equipment is configured to, after receiving the first message sent by the client node, send a key distribution request to the verification server by a second message, after receiving a key distribution response sent by the verification server, acquire the second shared key included in the key distribution response, and forward the keying materials included in the key distribution response to the client node;

the verification server is configured to, after receiving the second message sent by the third party equipment, compute the second shared key by using the keying materials including a second serial number generated by the verification server, and send the third party equipment the key distribution response comprising the second shared key and the keying materials, wherein before computing the second shared key between the client node and the third party equipment, the verification server acquires the first serial number included in the second message, compares the first serial number acquired with a third serial number stored in the verification server, and if the verification condition is satisfied, the verification server stores the first serial number acquired, and continues to compute the second shared key between the client node and the third party equipment, after receiving the first message, the third party equipment stores the first serial number sent by the client node, and when the third message is received, the third party equipment acquires the first serial number included in the third message, compares the first serial number acquired and the first serial number stored, and forwards the keying materials to the client node if the first serial number acquired is same as the first serial number stored, and when receiving the keying materials, the client node compares the first serial number received with the first serial number stored in the client node, and if the two serial numbers are the same, the client node computes the second shared key between the client node and the third party equipment.

9. The system according to claim 8, wherein the third party equipment is further configured to encrypt the second message by using a third shared key between the third party equipment and the verification server; and the verification server is further configured to carry out a second security verification for the second message by using the third shared key, and carry out a security verification for the first message included in the second message by using the first shared key.

10. The system according to claim 8, wherein the verification server is further configured to encrypt a portion including the keying materials of the key distribution response by using the first shared key, and encrypt a portion including the second shared key of the key distribution response by using a third shared key between the verification server and the third party equipment;

the third party equipment is further configured to carry out a security verification for a portion including the second shared key-of the received key distribution response, by using the third shared key;

the client node is further configured to carry out a security verification for the received keying materials by using the first shared key.

11. A verification server, comprising a receiving unit configured to receive a key distribution request sent by a third party equipment by a message which is encrypted by using a third shared key between the third party equipment and the verification server;

a computing unit configured to compute a second shared key between a client node and the third party equipment by using keying materials including a serial number generated by the verification server, after the receiving unit receives the key distribution request;

a sending unit configured to send to the third party equipment a key distribution response including the second shared key between the client node and the third party equipment and the keying materials, wherein before computing the second shared key between the client node and the third party equipment, the verification server acquires a serial number generated by the client node and included in the second message, compares the serial number generated by the client node with a serial number stored in the verification server, and if the verification condition is satisfied, the verification server stores the serial number generated by the client node, and continues to compute the second shared key between the client node and the third party equipment.

12. The verification server according to claim 11, further comprising:

a security verification unit configured to carry out a security verification for the key distribution request received by the receiving unit, and trigger the computing unit to compute the second shared key if the verification succeeds.

13. The verification server according to claim 11, further comprising:

a security protection unit configured to encrypt a portion including the keying materials of the key distribution response, by using a first shared key between the client node and the verification server, and encrypt a portion including the second shared key of the key distribution response, by using the third shared key.

14. A client node, comprising:

a serial number generating unit configured to generate a serial number;

a sending unit is configured to send to a third party equipment a key distribution request carrying the serial number generated by the serial number generating unit by a message which is encrypted by using a first shared key between the client node and a verification server ;

a keying material receiving unit is configured to receive keying materials forwarded by the third party equipment; and a computing unit is configured to compute a second shared key between the client node and the third party equipment, by using the keying materials received by the keying material receiving unit in a same method as the one used by the verification server, wherein when receiving the keying materials, the client node compares a serial number forwarded by the third party equipment with a serial number stored in the client node, and if the two serial numbers are the same, the client node computes the second shared key between the client node and the third party equipment.

15. The client node according to claim 14, further comprising:

a security verification unit configured to carry out a security verification for the keying materials received by the keying material receiving unit, by using the first shared key, and trigger the computing unit to compute the second shared key if the verification succeeds.

* * * * *

UNITED STATES PATENT AND TRADEMARK OFFICE
CERTIFICATE OF CORRECTION

| | | |
|---|---|---|
| PATENT NO. | : 8,484,469 B2 | Page 1 of 1 |
| APPLICATION NO. | : 12/728946 | |
| DATED | : July 9, 2013 | |
| INVENTOR(S) | : Chunqiang Li | |

It is certified that error appears in the above-identified patent and that said Letters Patent is hereby corrected as shown below:

Title page, Item 75, Inventor's City "Guangdong (CN)" should read -- Shenzhen (CN) --.

Signed and Sealed this
Twenty-fourth Day of September, 2013

Teresa Stanek Rea
*Deputy Director of the United States Patent and Trademark Office*